United States Patent [19]

Marchiori

[11] Patent Number: 4,969,342
[45] Date of Patent: Nov. 13, 1990

[54] ANTI-THEFT DEVICE FOR MOTOR VEHICLES

[76] Inventor: David P. Marchiori, 5914 Old Camp Bullis Rd., San Antonio, Tex. 78257

[21] Appl. No.: 402,338

[22] Filed: Sep. 5, 1989

[51] Int. Cl.⁵ .................. B60R 25/00; F16K 35/10
[52] U.S. Cl. ............................... 70/49; 70/178; 70/225; 70/232; 70/255; 70/259; 70/441; 251/294
[58] Field of Search .................. 70/255-260, 70/225, 226, 231-233, 441, 175-180, 30, 49, 237; 251/294; 137/68.1

[56] References Cited

U.S. PATENT DOCUMENTS

| | | | |
|---|---|---|---|
| 1,003,867 | 9/1911 | Bories | 70/441 |
| 1,500,849 | 7/1924 | Rudolph | 70/260 |
| 1,589,233 | 6/1926 | Schneider et al. | 70/226 |
| 1,660,752 | 2/1928 | Hicks | 70/178 |
| 1,996,182 | 4/1935 | Walker | 70/180 |
| 3,713,668 | 1/1973 | Flindt | 70/259 X |
| 4,833,442 | 5/1989 | Von Heck | 70/226 X |

FOREIGN PATENT DOCUMENTS 753380 8/1933 France ................... 70/232

Primary Examiner—Lloyd A. Gall
Attorney, Agent, or Firm—John C. Stahl

[57] ABSTRACT

An anti-theft device for motor vehicles equipped with tubeless tires, a collar secured to the valve stem of a selected tire, a locking device adapted to be detachably secured to said collar, a cable carrier mounted on a selected body part or other supporting structure of said vehicle and connected to said locking device whereby upon unauthorized movement or attempted theft of said vehicle the valve stem is forceably removed, said tire is deflated, and said vehicle is more difficult to move.

8 Claims, 2 Drawing Sheets

U.S. Patent  Nov. 13, 1990  Sheet 1 of 2  4,969,342
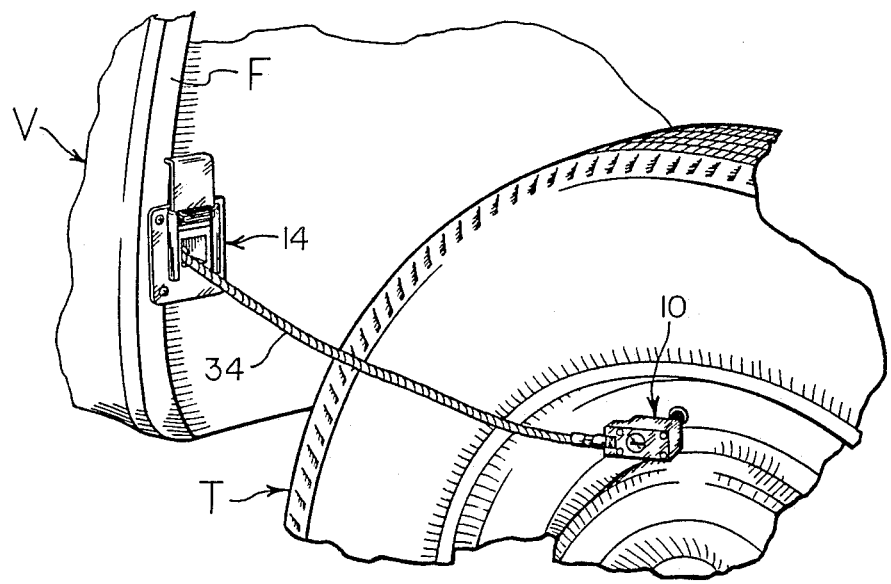
FIG. 1
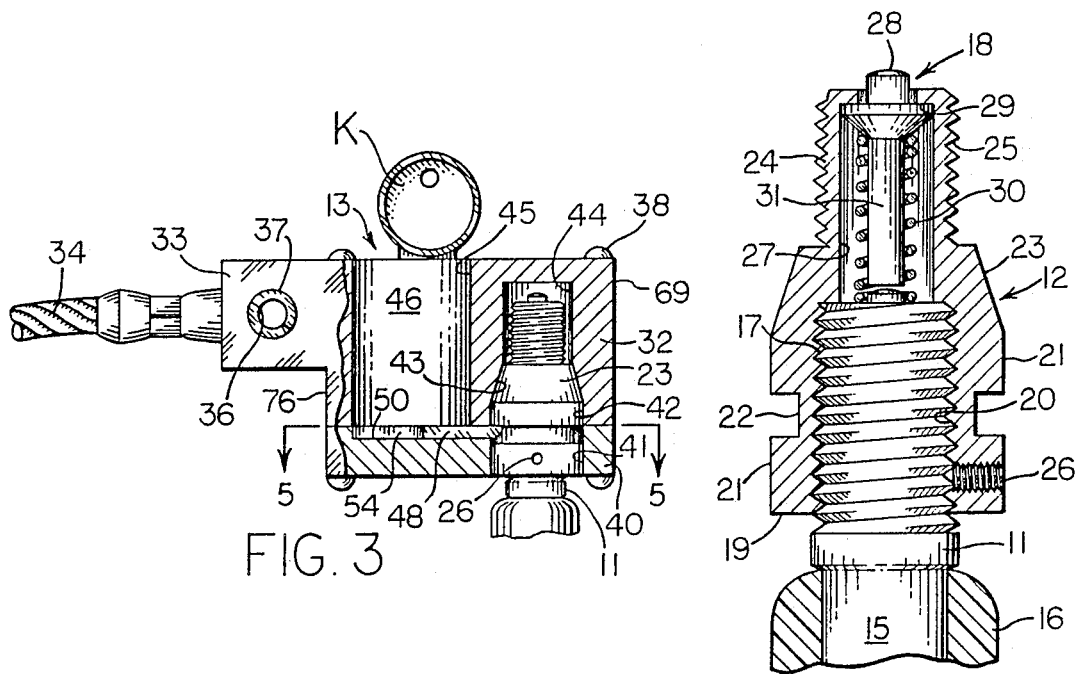
FIG. 3
FIG. 2
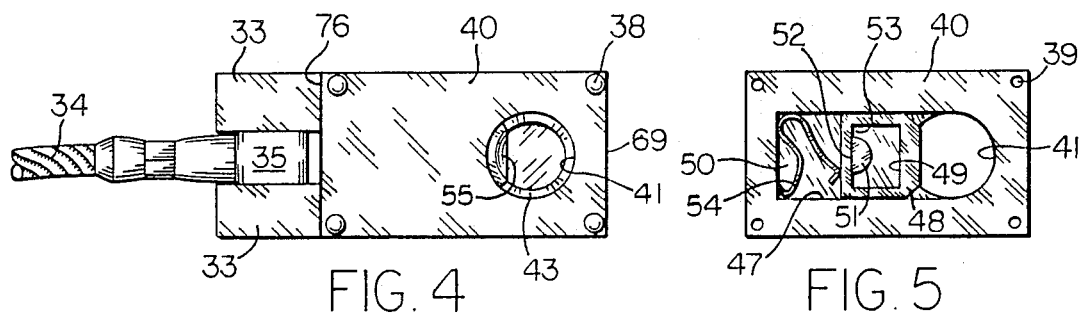
FIG. 4
FIG. 5

ANTI-THEFT DEVICE FOR MOTOR VEHICLES

BACKGROUND OF THE INVENTION

1. Field of the Invention

This invention relates to an anti-theft device for motor vehicles equipped with tubeless tires and more particularly to an improved anti-theft device for motor vehicles whereby upon attempted theft the valve stem of a selected tubeless tire is forceably removed, said tire is deflated, and the vehicle is more difficult to move.

2. Description of the Prior Art

U.S. Letters Pat. Nos. 1,601,816, 1,660,752, 1,685,924, 1,705,365, 1,774,936 and 1,782,584 have heretofore been granted for tire valve locks and the like. None of these patents teach means whereby upon unauthorized movement of a vehicle the valve stem of a selected tubeless tire is removed and the tire deflated thereby making attempted theft of said vehicle more difficult.

SUMMARY OF THE INVENTION

The primary object of this invention is to provide an anti-theft device for motor vehicles equipped with tubeless tires whereby upon unauthorized movement the valve stem of a selected tire is removed, the tire is deflated, and the vehicle is incapacitated.

Another object is to provide an anti-theft device for motor vehicles which may easily be installed on any motor vehicle having tubeless tires without effecting the normal inflating or deflating of said tires.

Still another object is to provide such an anti-theft device for motor vehicles wherein said motor vehicle is not permanently damaged and said vehicle may again be made operative merely by changing the tire after attempted theft of said vehicle.

A further object is to provide an anti-theft device for motor vehicles including signaling means associated therewith to notify the driver if said anti-theft device is not uncoupled prior to moving said vehicle.

A still further object is to provide such an anti-theft device for motor vehicles wherein said device is conveniently stowed when said device is not connected to a selected tire.

Other objects and features of the invention will become apparent to those skilled in the art from the following specification when read in the light of the annexed drawings.

BRIEF DESCRIPTION OF THE DRAWINGS

FIG. 1 is a fragmentary, perspective view showing the preferred embodiment of an anti-theft prevention device for motor vehicles, adapted to be used in connection with at least one wheel of said vehicle.

FIG. 2 is a greatly enlarged, vertical sectional view of the collar adapted to be secured to a conventional tubeless tire valve stem.

FIG. 3 is an enlarged side elevational view, partly broken away and partly in section, of the locking device adapted to be detachably secured to the collar of FIG. 2.

FIG. 4 is a bottom plan view taken of the locking device of FIG. 3.

FIG. 5 is a top plan view, taken along the plane of line 5—5 of FIG. 3, looking in the direction of the arrows.

DESCRIPTION OF PREFERRED EMBODIMENTS

Figure 6:
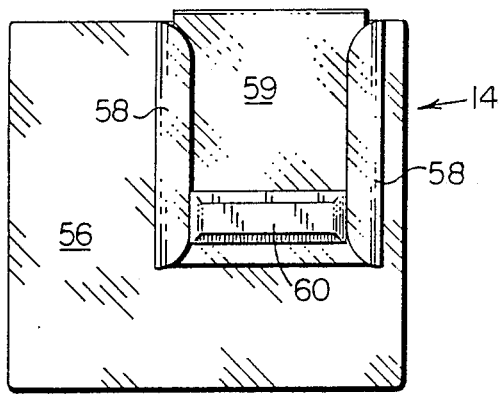
FIG. 6 is a slightly reduced front elevational view of the cable carrier of the subject invention adapted to be secured to a motor vehicle in proximity to a selected tire utilizing the subject invention.

Referring now to the drawings, wherein like reference characters designate like or corresponding parts throughout the several views, there is shown in FIGS. 1–8 of the drawings a preferred embodiment of motor vehicle anti-theft device 10 of the subject invention including, in combination, a conventional tubeless tire valve stem 11 of a selected tire T, collar 12 adapted to be secured to said valve stem, locking device 13 adapted to be detachably secured to said collar, and cable carrier 14 mounted on a selected body part, chassis, or other supporting structure on or attached to motor vehicle V and accommodating locking device 13 in stowed condition.

More specifically, valve stem 11 normally comprises a brass sleeve 15 and an outer covering 16 of rubber composition forming the stem and base portions whereby said valve stem is secured to the rim of a wheel; sleeve 15 terminates upwardly and exteriorly in male threads 17 corresponding to standard tire valves and to which a dust cap or valve extension (not shown) is normally threaded. Internally, a closure member indicated generally by reference numeral 18, such as a button-type closure member disclosed in U.S. Letters Pat. Nos. 3,180,349 and 3,315,695, a ball-type closure member as disclosed in Letters Patent No. 2,939,478, and a needle-type closure member as disclosed in Patent Nos. 2,508,503, 2,731,061 and 4,171,119, is utilized.

As best seen in FIG. 2 of the drawings, collar 12 of desired diameter and preferably of brass or other metallic composition terminates downwardly in flat base 19; axially extending female threads 20, adapted to mate with threads 17 on sleeve 15, extend upwardly as hereinafter to be more fully described. Collar 12 includes cylindrical section 21 of desired height with circumferential groove 22 provided therein; cylindrical section 21 terminates upwardly in inwardly tapered section 23 and thence in reduced diametral section 24 provided with male threads 25 corresponding to a standard tire valve. Radially extending set screw 26 in section 21, preferably below groove 22, is adjusted to bear against threads 17 to secure collar 12 onto sleeve 15 of said valve stem; alternatively, an epoxy adhesive or the like may also be used to fixedly secure collar 12 to the valve stem.

It is to be understood that throughout the specification and claims the term "closure member" is used in a generic sense and the invention is not to be restricted solely to a button-type closure, a ball-type closure, or a needle-type closure in the internal, upper section of collar 12. For purposes of illustration only and not in limitation, female threads 20 heretofore mentioned terminate upwardly in proximity to the medial portion of tapered section 23 and communicate with an axial bore 27 of lesser diameter, either smooth surfaced or threaded, determined by the type of closure member 18 utilized in the practice of the invention. As illustrated, closure member 18 comprises button 28 retained in bore 27 by means of shoulder 29 and biased in closed condition by means of spring 30 carried on downwardly depending shaft 31 of member 18; upon depressing button 28 the remote end of shaft 31 depresses the closure member in the existing tire valve stem whereby compressed air may be applied therethrough to inflate the tire, or deflate said tire.

Referring now to FIGS. 3–5 of the drawings, locking device 13 in which collar 12 is detachably secured is of metallic composition and includes a generally rectangular and upstanding body 32 with integrally formed, laterally extending and transversely spaced lugs 33 on the upper, left-hand end thereof. Cable 34 is crimped or otherwise secured at one end to block 35 carried intermediate said lugs; transversely aligned bores 36 in said lugs and block 35 receive longitudinally split, hollow cylindrical pin 37 whereby said cable is hingedly connected at one end to said locking device.

Rivets 38 passing downwardly through aligned bores 39 in body 32 and base plate 40 of corresponding length and width are expanded and secure such parts together; machine screws, an adhesive, or welding may also be utilized for such purpose. Vertical bore 41 is provided in base plate 40 in proximity to the right-hand end thereof; communicating bore 42 of like diameter in body 32 extends upwardly, thence inwardly in tapered section 43 corresponding to the angular inclination of section 23 of the collar, and thence in communicating axial bore 44 at least slightly greater in diameter than section 24 of said collar, to receive collar 12 in a relatively tight fit. As viewed in FIG. 3, base 19 of collar 12 normally lies in the horizontal plane of the lower surface of base plate 40 and set screw 26 by which collar 12 is secured to sleeve 15 of the valve stem is not accessible to tampering or surreptitious removal.

Vertical bore 45 adjacent the left-hand end of body 32 passes therethrough and cylindrical lock 46, activated by key K, is conventionally secured therein. A generally rectangular recess 47 of shallow depth is milled or otherwise provided in the upper surface of base plate 40 (see FIG. 5), said recess extends from bore 45 on the left and communicates with bore 41 on the right. Latch 48, including a generally rectangular opening 49 the major axis of which lies in its longitudinal plane, rides on surface 50 of recess 47; the lower end of shaft 51 of lock 46 inerts into opening 49, flat 52 of shaft 51 bears against inner shoulder 53 of opening 49 and said latch 48 is normally biased to the right and at least partially entends into bore 41 by means of U-shaped spring 54.

As best seen in FIG. 4, an upwardly directed, arcuately-shaped, inclined surface 55 is milled or otherwise provided on the lower, medial surface of latch 48. When collar 12 is inserted upwardly into bore 41, tapered section 23 bears against inclined surface 55 forcing latch 48 to the left. After collar 12 is seated in bores 41, 42 spring 54 forces latch 48 to the right and at least partially inserts into groove 22 of said collar, securing said collar in locking device 13. Upon rotation of key K, shaft 51 of lock 46 is rotated in a direction opposite to the force applied by spring 54, the remote end of said latch is retracted from groove 22 in said collar and locking device 13 may be removed from the collar on the valve stem.

Figure 7:
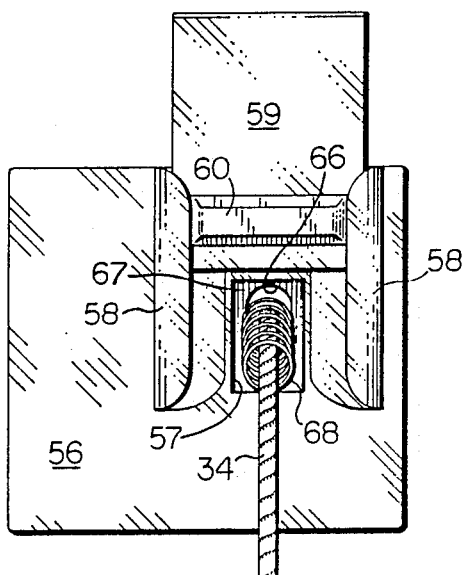
FIG. 7 is a front elevational view of the cable carrier of FIG. 6 with the cover in partly raised condition and the cable at least partially extended.
Figure 8:
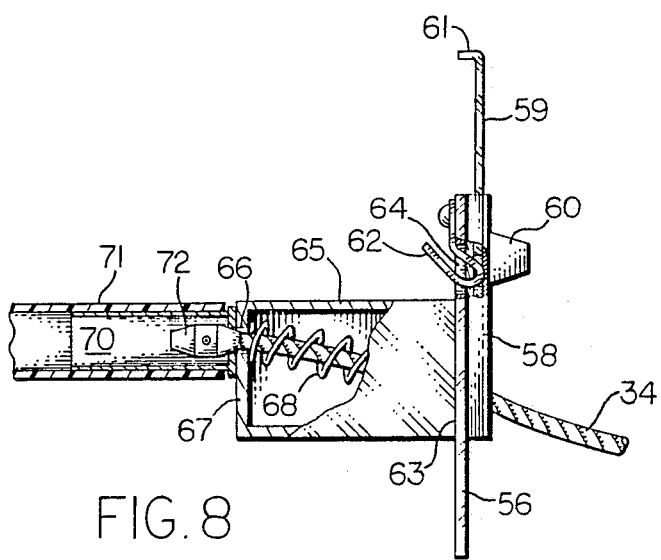
FIG. 8 is a side elevational view, partly broken away and partly in section, of the cable carrier in FIGS. 6 and 7.

Referring now to FIGS. 6–8 of the drawings, there is shown cable carrier 14 adapted to be mounted on a selected body part or other supporting structure of the motor vehicle. As viewed in FIG. 1, carrier 14 is mounted upon an inwardly directed flange F or other conveniently accessible part of the vehicle in close proximity to each tire with which device 10 is to be utilized. Specifically, essentially square and upstanding plate 56 may be secured laterally to flange F by machine screws (not shown) or the like. Rectangular opening 57 of sufficient dimensions to permit passage of locking device 13 is provided therein. Vertically extending and opposing brackets 58 are secured laterally of opening 57 and receive cover 59; handle 60 intermediate brackets 58 is secured to the approximate lower, outer surface of said cover. Cover 59 terminates upwardly in a perpendicular flange 61 which when abutting the upper edge of said plate serves as a lower limit stop for said cover; bent spring 62 mounted on back 63 of said plate at least partially inserts through bore 64 in said plate and inserts into a communicating bore (not shown) or indention in cover 59 centrally above the horizontal plane of the upper edge of opening 57 whereby said cover is maintained in raised condition, as viewed in FIG. 7.

Hollow casing 65, desirably of metallic composition, is secured to plate 56 and communicates with opening 57 therein. As shown in FIG. 7, cable 34 passes through bore 66 in back 67 of said casing with compression spring 68 normally carried thereon. When locking device 13 is inserted through opening 57 said spring bears against the inner surface of back 67 and lugs 33, respectively; right-hand end 69 (see FIG. 3) of said locking device 13 bears against the inner surface of cover 59 firmly securing said locking device 13 in the casing.

Sleeve 70 is fixedly secured to casing 65 and one end of flexible tubing 71 is conventionally secured thereto; the remote end of said tubing is preferably capped (not shown). Cable 34 is normally carried in sleeve 70 and flexible tubing 71; the remote end of cable 34 includes ring 72 or the like conventionally secured thereto and adapted to insert into sleeve 70 and bear against the rear surface of back 67 of said casing, serving as a stop for outward movement of said cable. Tubing 71 may be conventionally secured to any selected body part, chassis, or other supporting structure on or attached to said vehicle. In use, cable 34 is retracted any desired distance to permit locking device 13 to be detachably secured to collar 12 on a selected tire valve stem of said vehicle. It is obvious that if the vehicle is moved any distance exceeding the length of cable 34 that a force will be applied to collar 12, valve stem 11 of the tire will be forceably removed, and the tire will be deflated.

Figure 9:
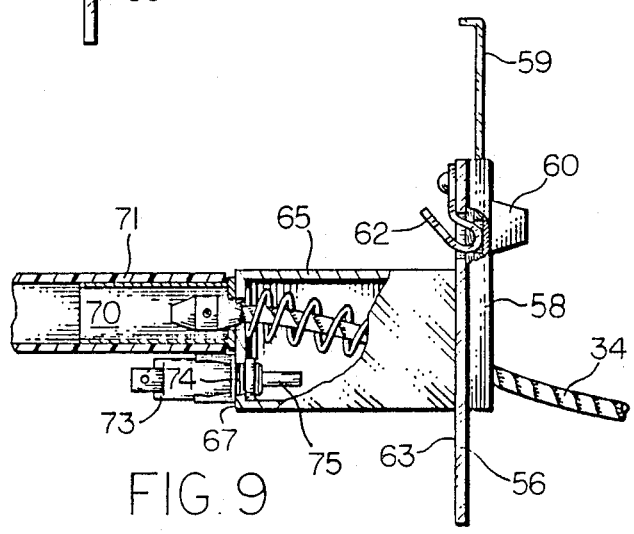
FIG. 9 is a side elevational view, partly broken away and partly in section, of a modification of the cable carrier of FIGS. 6–8.

There is shown in FIG. 9 a modification of the cable carrier of FIGS. 6–8 including an electrical switch 73 mounted on back 67 of said casing and electrically connected to the vehicle's power supply; bore 74 accommodates elongated contact 75 of switch 73 and normally bears against rear surface 76 of locking device 13, said switch is normally open at such time. Upon removal of locking device 13 from casing 65, contact 75 extends outwardly, the electrical contacts of said switch are closed, and a warning indicator such as a light (not shown) mounted on the dashboard of said vehicle is activated and indicates to the driver that device 10 is still secured to a selected valve stem and must be removed prior to moving said vehicle. Replacement of locking device 13 in the cable carrier 14 deactivates such warning indicator.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. In combination, a motor vehicle comprising a chassis, a body, a plurality of wheels mounted on said chassis, each of said plurality of wheels consisting of a rim, a tubeless tire mounted on said rim, and a valve stem on said rim, an anti-theft device comprising
   a collar adapted to be secured to at least one valve stem,
   a locking device,
   a cable carrier adapted to be mounted on said vehicle,
   a flexible cable having first and second ends,
   said first end of said cable hingedly connected to said locking device,
   said second end of said cable secured to said cable carrier,
   said locking device and flexible cable adapted to be inserted into said cable carrier in stowed condition,
   said locking device adapted to be detachably secured to said collar whereby upon rotation of said wheel said valve stem is removed and said tire deflated.

2. The combination of claim 1 wherein said collar inserts into said locking device.

3. The combination of claim 2 wherein said collar includes a circumferential groove and said locking device includes a lock and coacting latch, said latch adapted to at least partially insert into said groove in said collar.

4. The combination of claim 1 wherein said locking device includes a key-operated lock and coacting latch, said collar including a circumferential groove into which said latch is adapted to at least partially insert.

5. The combination of claim 4 wherein said latch is spring biased to at least partially insert into said circumferential groove in said collar.

6. The combination of claim 1 further including means in said cable carrier to indicate that said anti-theft device has not been removed from its coacting valve stem.

7. In combination, a motor vehicle comprising a chassis, a body, a plurality of wheels mounted on said chassis, each of said plurality of wheels consisting of a rim, a tubeless tire mounted on said rim, and a valve stem mounted on said rim, an anti-theft device comprising
   a collar adapted to be secured to at least one valve stem,
   a locking device,
   said collar adapted to be inserted into said locking device,
   a cable carrier adapted to be mounted on said vehicle,
   a flexible cable having first and second ends,
   said first end of said cable hingedly connected to said locking device,
   said second end of said cable secured to said cable carrier,
   said locking device and flexible cable adapted to be inserted into said cable carrier in stowed condition,
   a key-operated lock and coacting latch mounted in said locking device,
   said latch coacting with said collar to secure said collar in said locking device whereby upon movement of said vehicle said valve stem is removed from said rim and said tire deflated.

8. In combination, a motor vehicle comprising a chassis, a body, a plurality of wheels mounted on said chassis, each of said plurality of wheels consisting of a rim, a tubeless tire mounted on said rim, and a valve stem mounted on said rim, an anti-theft device comprising
   a collar adapted to be secured to at least one valve stem,
   a circumferential groove in said collar,
   a locking device including a lock and coacting latch,
   said collar adapted to be inserted into said locking device,
   said latch adapted to at least partially insert into said groove in said collar,
   a cable carrier adapted to be mounted on said vehicle,
   a flexible cable having first and second ends,
   said first end of said cable hingedly connected to said locking device,
   said second end of said cable secured to said cable carrier,
   said locking device and flexible cable adapted to be inserted into said cable carrier in stowed condition,
   said locking device adapted to be secured to said collar whereby upon rotation of said wheel said valve stem is removed from said rim and said tire is deflated.

* * * * *